United States Patent [19]

Stevens et al.

[11] 4,092,339

[45] * May 30, 1978

[54] PROCESS FOR MAKING POLYGLYCIDYL ESTERS

[75] Inventors: Violete L. Stevens; Arthur R. Sexton, both of Midland, Mich.; Frederick P. Corson, Sudbury, Mass.

[73] Assignee: The Dow Chemical Company, Midland, Mich.

[*] Notice: The portion of the term of this patent subsequent to Nov. 4, 1992, has been disclaimed.

[21] Appl. No.: 633,583

[22] Filed: Nov. 19, 1975

Related U.S. Application Data

[63] Continuation-in-part of Ser. No. 466,098, May 2, 1974, abandoned.

[51] Int. Cl.$^2$ .................................................. C09F 5/08
[52] U.S. Cl. ........................ 260/410.6; 260/18 EP; 260/22 EP; 260/408; 260/407; 560/76; 560/98; 560/100; 560/103; 560/190; 560/192; 560/205; 560/215; 560/240
[58] Field of Search ............ 260/410.6, 488 T, 486 R, 260/475 P, 485 G, 404.8, 407, 22 EP, 18 EP; 560/76, 98, 100, 103, 190, 192, 240, 205, 215

[56] References Cited

U.S. PATENT DOCUMENTS

| | | | |
|---|---|---|---|
| 2,652,421 | 9/1953 | De Groote | 260/485 G |
| 2,695,915 | 11/1954 | De Groote | 260/486 R |
| 3,256,226 | 6/1966 | Fekete et al. | 260/22 EP |
| 3,265,646 | 8/1966 | Kraft et al. | 260/22 EP |
| 3,519,559 | 7/1970 | Quinlan | 260/410.6 X |
| 3,666,671 | 5/1972 | Kolopissis | 260/410.6 X |

FOREIGN PATENT DOCUMENTS

| | | | |
|---|---|---|---|
| 464,163 | 4/1950 | Canada | 260/410.6 |
| 1,154,228 | 6/1969 | United Kingdom | 260/410.6 |
| 1,267,259 | 3/1972 | United Kingdom | 260/410.6 |

Primary Examiner—Winston A. Douglas
Assistant Examiner—John F. Niebling
Attorney, Agent, or Firm—David H. Fifield; C. E. Rehberg

[57] ABSTRACT

Homopolymers and copolymers of glycidyl esters are made by reacting the acids to be esterified with the corresponding polymer of tert.-alkyl glycidyl ether under substantially anhydrous conditions and in the presence of a strong acid catalyst, preferably a sulfonic acid. The reaction proceeds satisfactorily at about 100°–150° C with displacement of the tert.-alkyl group by the acyl group of the acid and evolution of tert.-olefin. By use of the appropriate proportion of reactant acid and/or appropriate reaction time, any desired proportion of the glycidyl groups can be esterified.

12 Claims, No Drawings

PROCESS FOR MAKING POLYGLYCIDYL ESTERS

BACKGROUND OF THE INVENTION

Vandenberg U.S. Pat. No. 3,446,757 discloses a process for making polymers of glycidol by (1) polymerizing silicon esters of glycidol, alone or with other alkylene oxides, and then removing the silicon groups by hydrolysis.

Vanlerberghe, British Pat. No. 1,267,259, discloses the dealkylation of polymers of tert.-butyl glycidyl ether by heating the polymer with water and a sulfonic acid catalyst. The resulting polyglycidol may then be esterified.

SUMMARY OF THE INVENTION

Homopolymers and copolymers of glycidyl esters are made by reacting the acids corresponding to the desired esters with the corresponding tert.-alkyl glycidyl ethers. In the reaction the tert.-alkyl moieties of the ethers are displaced and, to the desired degree, replaced with the acyl moieties of the acid, thus producing glycidyl ester moieties. Those tert.-alkyl groups not converted to ester groups are predominantly converted to primary hydroxyl groups. These reactions may be illustrated as follows:

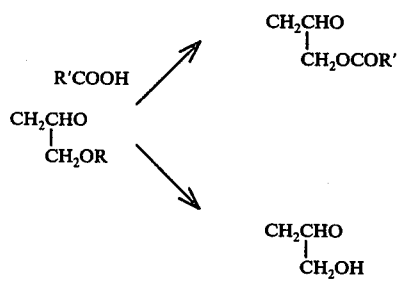

wherein R is tert.-alkyl, R'COOH is a carboxylic acid and the wavy lines represent the polyoxyalkylene backbone of the polymer. The proportion of the tert.-alkyl ether groups that are converted to ester or to hydroxyl groups, respectively, is determined by the proportion of esterifying acid used and/or the amount of water produced in the reaction.

The tert.-alkyl glycidyl ether polymers useful in practicing the invention are those having tert.-alkyl groups such that the corresponding alkene is volatile at the reaction temperature so that it may be removed during the reaction. As a practical matter, the tert.-butyl ethers are of primary interest, though others, such as the tert.-amyl ethers, can be used.

DETAILED DESCRIPTION OF THE INVENTION

The process of the invention is conducted in the presence of a strong acid catalyst. Suitable catalysts include boron trifluorides, phosphoric acid, sulfuric acid, alkanesulfonic acids and arylsulfonic acids. Examples of the latter types include octanesulfonic acid, hexadecanesulfonic acid, benzenesulfonic acid, toluenesulfonic acid and naphthalenesulfonic acid. The arylsulfonic acids are preferred. Only a catalytic amount of such acids is needed.

The tert.-alkyl glycidyl ether polymers that are used as starting materials in the process of the invention may be substantially any polymer comprising tert.-alkyl glycidyl ether moieties. They constitute a known class of materials, useful examples of which are shown in our above-cited copending applications, in British Pat. No. 1,267,159 and in U.S. Pat. Nos. 3,519,559 and 3,509,074. Other useful examples are shown by Okada et al., Kogyo Kagaku Zasshi, 66, 115 (1963) (C.A., 59, 4046 (1963)), Il'chenko et al., Dokl. Akad. Navk SSSR 1970, 192 (C.A. 73, 88253 (1970)) and Koinuma et al., Makromol. Chem., 136, 65 (1970). Any of the tert.-alkyl glycidyl ether polymers disclosed in the foregoing references are useful in the present invention and other similar ones can be made by the methods there disclosed. The term "polymers" as used herein is intended to include homopolymers, copolymers, terpolymers, etc., including heteric (random) as well as block copolymers wherein the comonomers may be present in any significant proportion and arrangement.

The acids useful to make esters according to the invention include substantially any carboxylic acid. The monocarboxylic acids produce esters having the same polymer backbone as the tert.-alkyl ether starting material, the difference being that most or all of the tert.-alkyl groups have been removed and, to the desired extent, replaced with the acyl group of the reactant acid. Those not so replaced are converted to hydroxyl groups. Dicarboxylic acids extend the chain length of the backbone of the polymer and may also initiate branching and, ultimately, cross-linking of the polymer. Polycarboxylic acids of functionality greater than two, even when used in small amounts, quickly cross-link and gel the polymer; hence, they are ordinarily used in very small amounts if at all.

The preferred monocarboxylic acids are the saturated fatty acids, such as acetic butyric, lauric and stearic acids; the olefinic fatty acids, such as acrylic, methacrylic, undecylenic, oleic and linoleic acids; the aromatic acids, such an benzoic, alkylbenzoic and naphthoic acids, and the chloro- and bromo-analogs of the foregoing. It is, of course, possible to use the anhydrides of the acids rather than the acids themselves. They are particularly useful where partial esters of polycarboxylic acids are desired as the final product, in which case a mole of the anhydride is used for each carboxyl group desired in the product and the esterification is run under mild conditions so as to minimize the formation of diesters of the acid derived from the anhydride. Suitable polycarboxylic acids and anhydrides include the alkanedicarboxylics, such as succinic, adipic and sebacic; the alkenedicarboxylics, such as maleic, itaconic, citraconic and glutaconic; and the aromatics, such as phthalic, isophthalic and terephthalic.

In practicing the invention, a polyoxyalkylene compound containing tert.-alkyl glycidyl ether moieties, i.e., groups of the formula

wherein R is a tert.-alkyl group, is prepared by known means. This is conveniently done by the homopolymerization of a tert.-alkyl glycidyl ether or the copolymerization of such an ether with one or more other cyclic ethers, such as ethylene oxide, propylene oxide, butylene oxide, trimethylene oxide, tetrahydrofuran, epichlorohydrin, 2,2-bis(halomethyl)oxetane, or the like. Such polymerizations may be conducted with various catalysts, such as alkali metal hydroxides, Friedel-Crafts catalysts, aluminum alkyls, zinc alkyls or other known catalysts for the polymerization of alkylene oxides. If conducted in the presence of an initiator compound having one or more active hydrogen atoms, polymer chains are initiated at the sites of these atoms, as is well known in the art. Such polymers have terminal hydroxyl groups which may, if desired, be esterified prior to or simultaneously with the sites of the tert.-alkyl ether groups.

The essential step of the process of the invention, i.e., the simultaneous dealkylation and esterification reaction, is carried out by heating the polymer having tert.-alkyl ether groups with the acid or anhydride that is to be esterified in the presence of a strong acid catalyst and simultaneously removing the alkene corresponding to the tert.-alkyl group and any water formed in the reaction. The reaction may be conducted by simply mixing the reactants and the catalyst and heating to reaction temperature. Removal of the by-product alkene may be facilitated by operating under reduced pressure and/or sparging a stream of inert gas through the reaction mixture. These techniques likewise aid in removal of any water produced in the reaction. Removal of water is further facilitated by using as a reaction solvent a water-immiscible organic solvent, such as a hydrocarbon or halohydrocarbon of suitable boiling point such that at reflux its azeotrope with water is distilled and the water removed. Upon completion of the reaction, as indicated by the evolution of olefin and/or water, the product is obtained by removal of the catalyst, solvent and unreacted acid if any.

Since the polyether reactant is more or less polymeric in nature, the esterification reaction with a carboxylic acid becomes slow toward the end and tends to be incomplete unless vigorously pushed. Where it is important to accomplish complete esterification it is often expedient to add the anhydride of the acid near the end of the reaction, since it is much more reactive than the acid itself. Use of a stoichiometric excess of the acid or anhydride also favors complete esterification.

SPECIFIC EMBODIMENTS OF THE INVENTION

The following examples illustrate the practice of the invention.

A. Preparation of tert.-Butyl Glycidyl Ether Polymers and Copolymers

Monomeric tert.-butyl glycidyl ether (TBGE) was homopolymerized or copolymerized in various proportions with other cyclic ethers in known manner, the products and their preparation being summarized in Table I. The indicated initiators were the active hydrogen compounds used to initiate the polymer chains. In all runs, the reaction was continued until all TBGE and other alkylene oxides fed to the reactor had reacted, thus assuring that the molar proportions in the product were the same as in the reactor feed. Molecular weights of the products were estimated by the acetic anhydride method, based on the expected number of hydroxyl groups per molecule.

TABLE I

| Run No. | Initiator[a] | Catalyst | Monomers, Mole % TBGE | Monomers, Mole % Other[b] | Molecular Weight of Product | Monomer Units Per Mole TBGE | Monomer Units Per Mole Other |
|---|---|---|---|---|---|---|---|
| 1 | TEG | Na | 50 | PO, 50 | 500 | 1.9 | 1.9 |
| 2 | EG | $BF_3$ | 100 | — | 790 | 5.6 | 1.0 |
| 3 | TEG | Na | 75 | PO, 25 | 500 | 2.3 | 3.8 |
| 4 | EG | Na | 100 | — | 2350 | 17.6 | 1.0 |
| 5 | TEG | Na | 100 | — | 4950 | 37.0 | 3.0 |
| 6 | $H_2O$ | NaOH | 100 | — | 709 | 5.3 | 0 |
| 7 | $H_2O$ | NaOH | 50 | EO, 50 | 2000 | 11.4 | 11.4 |
| 8 | $H_2O$ | $BF_3$ | 100 | — | 1000 | 7.6 | 0 |
| 9 | TEG | Na | 100 | — | 17000 | 130.0 | 3.0 |
| 10 | PG | KOH | 14 | PO, 86 | 1900 | 4.0 | 25.0 |
| 11 | $H_2O$ | KOH | 50 | EO, 50 | 1200 | 6.8 | 6.8 |
| 12 | EG | KOH | 75 | EO, 25 | 6500 | 44.5 | 15.8 |
| 13 | $CH_3OH$ | Na | 71 | PO, 29 | 700 | 4.4 | 1.7 |
| 14 | $CH_3OH$ | $BF_3$ | 100 | — | 700 | 5.1 | 0 |
| 15 | BPA | KOH | 50 | EO, 50 | 1200 | 5.6 | 5.6 |
| 16 | EG | KOH | 75 | EO, 25 | 1000 | 6.5 | 3.2 |
| 17 | 2-Ethylhexanol | NA | 100 | — | 700 | 4.4 | 0 |
| 18 | Isooctanol | Na | 100 | — | 600 | 3.6 | 0 |
| 19 | Glycerol | KOH | 25 | EO, 75 | 1100 | 3.9 | 11.5 |
| 20 | P-400 | Na | 9 | PO, 91 | 3300 | 4.0 | 47.5 |
| 21 | $H_2O$ | $BF_3$ | 46 | THF, 54 | 1600 | 7.4 | 8.6 |
| 22 | $H_2O$ | KOH | 21 | EO, 79[c] | 2300 | 8.0 | 30.0 |
| 23 | $CH_3OH$ | $BF_3$ | 71 | PO, 29 | 800 | 5.0 | 2.0 |
| 24 | None | $Al(Et)_3$ | 50 | BO, 50 | $>1\times10^6$ | >5000 | >5000 |
| 25 | TEG | Na | 100 | —. 6150 | 46 | 3.0 | |
| 26 | EG | $BF_3$ | 100 | — | 1000 | 7.2 | 1.0 |
| 27 | $H_2O$ | KOH | 33 | PO, 67 | 996 | 4.0 | 7.9 |
| 28 | $H_2O$ | KOH | 25 | EO, 75 | 5000 | 19.0 | 57.3 |
| 29 | $H_2O$ | KOH | 50 | EO, 50 | 5100 | 29.3 | 29.3 |
| 30 | EG | KOH | 13 | PO, 48; BO, 39 | 1820 | 3.1 | 9.8 BO 12.1 PO |
| 31 | EG | KOH | 25 | EO, 75 | 20000 | 76.3 | 229 |
| 32 | $H_2O$ | KOH | 10 | EO, 90 | 5000 | 9.5 | 85.6 |
| 33 | $H_2O$ | KOH | 5 | EO, 95 | 6000 | 6.2 | 11.8 |

[a]TEG is triethylene glycol, EG is ethylene glycol, PG is propylene glycol, BPA is bisphenol A and P-400 is polypropylene glycol of molecular wt. 400.
[b]PO is propylene oxide, EO is ethylene oxide, THF is tetrahydrofuran and BO is 1,2-butylene oxide.
[c]Block copolymer made by reacting one equivalent of water with first 6 eq. of EO, then 4 eq. of TBGE, then 12 eq. of EO, then 4 eg. of TBGE and, finally, 12 eq. of EO.

B. Dealkylation and Esterification of the Polymers Listed in Table I

The polymers of Table I have $n$ terminal hydroxyl groups, where $n$ is the functionality of the initiator $RH_n$. These hydroxyl groups can be esterified without disturbing the tert.-butoxy groups by reaction with an acid anhydride or, in the presence of a base, by use of an acyl halide. Attempts to esterify them with carboxylic acids in the presence of strong acid catalysts result in dealkylation (loss of isobutylene) together with esterification of the resultant primary hydroxyl groups. Thus, a particular feature of this invention is the discovery that the tert.-butyl glycidyl ether polymers and copolymers can be terminally esterified independently of the tert.-butoxy groups and that the latter groups can be simultaneously and in a single step dealkylated and, to any desired extent, esterified by reaction with a carboxylic acid. The latter reactions are catalyzed by strong acid catalysts, especially the arylsulfonic acids.

Esterification of the terminal hydroxyl groups of the tert.-butyl ether polymers and copolymers by use of acyl halides or half-esterification of acid anhydrides can be accomplished under mild conditions, such as 30°-90° C., whereas dealkylation and/or esterification of carboxylic acids requires acid catalysis and temperatures of about 90° or more for a convenient rate of reaction. When esterifying saturated acids, temperatures of about 125°-150° are preferred. When using highly polymerizable acids, such as acrylic or methacrylic acid, it is necessary to use a polymerization inhibitor, such as $Cu_2O$ or a hydroquinone. Lower temperatures, such as about 90°-110° may be used, however, because of their higher reactivity.

The following typical example illustrates the dealkylation-esterification process.

A reactor was charged with 50 g. (0.05 m.) of a homopolymer of tert.-butyl glycidyl ether of molecular weight of 1000, 27.4 g. (0.19 m) of octanoic acid and 0.8 g. of p.-toluenesulfonic acid. The charge was heated at 137° C. for 6 hours, water being distilled out as formed (3.4 g.).

The crude product was dissolved in methanol and passed through a mixed ion exchange column. The solvent and other volatile materials were distilled to a final temperature of 100° at 1 mm. pressure, thus leaving the purified product as an oily liquid. Yield, 48 g. (93%). Analysis by NMR confirmed that essentially all of the tert.-butyl groups had been removed and that one-half of them had been replaced with octanoyl groups, the other half being replaced by hydrogen, thus generating primary alcoholic groups (glycidol moieties).

Because of the desirability of some primary hydroxyl in the products, the above examples show only partial esterification of the polymers. However, essentially complete esterification is readily accomplished by use of at least the stoichiometric amount of acylating agent and continuing the reaction until essentially complete. Thus, the reaction of Run No. 65 or 66 was repeated except that 46 moles of stearic acid were used, the product was essentially full esterified and contained essentially no primary hydroxyl.

Table II summarizes the results of a series of experiments wherein the polymers listed in Table I were dealkylated and partially esterified as described above. The starting material is identified by the Run No. as shown in Table I. The amounts of acids used in the esterification reactions are shown as moles/mole of starting material. It may be noted that in some instances excess acid was used. When the esterification was conducted stepwise with two different acids, the acid used in the first step was completely reacted, then the second acid was added and reacted either partially or entirely (e.g., Runs 43, 47 and 54. In Run 49 the acetate esters were made by use of the acetic anhydride after the dealkylation-acrylic acid ester step was completed. In all runs in which both acrylic acid and maleic anhydride were used, the two were mixed and, hence, reacted simultaneously.

In Table II the products are characterized by the number of acyl groups and the number of primary hydroxyl groups (glycidol units) per molecule of the product. The ester groups were determined by NMR and the hydroxyl groups were calculated by difference, all calculations being based on the molecular weights shown in Table I.

TABLE II

| Run No. | Starting Material, Table I Run No. | Acylating Agents[a] Moles/Mole | | Products, Units/Mole | |
|---|---|---|---|---|---|
| | | | | Ester | Primary Hydroxyl |
| 34 | 1 | AA, | 2.3 | | |
| 35 | 2 | AA, | 8.8 | | |
| 36 | 4 | AA, | 26 | | |
| 37 | 5 | AA, | 56.5 | | |
| 38 | 1 | AA, | 4.0 | 1.7 | .2 |
| 39 | 3 | AA, | 4.7 | 1.9 | .4 |
| 40 | 7 | AA, | 3.0 | 3.0 | 8.5 |
| 41 | 6 | MAA, | 7.5 | 5.3 | .2 |
| 42 | 9 | MAA, | 129 | 96 | 34 |
| 43 | 10 | Octanoic, | 1.5 | 2.4 | .2 |
| | | AA, | 3.5 | | |
| 44 | 10 | MA, | 2.0 | 3.9 | .1 |
| | | AA, | 4.0 | | |
| 45 | 11 | AA, | 8.9 | 4.7 | 2.2 |
| 46 | 11 | MA, | 2.0 | 5.3 | 1.6 |
| | | AA, | 11.5 | | |
| 47 | 12 | PA, | 0.5 | 20.8 | 3.8 |
| | | AA, | 26.4 | | |
| 48 | 13 | AA, | 7.0 | 3.5 | .9 |
| 49 | 14 | Acetic a. | 1.5 | 3.4 | .5 |
| | | AA, | 7.0 | | |
| 50 | 15 | AA, | 8.3 | 3.9 | 1.7 |
| 51 | 17 | AA, | 8.4 | 2.8 | 1.8 |
| 52 | 18 | AA, | 8.6 | 2.6 | 2.2 |
| 53 | 19 | AA, | 7.5 | 3.0 | .9 |
| 54 | 16 | HDC, | 0.5 | 4.8 | 2.4 |
| | | AA, | 7.0 | | |
| 55 | 20 | AA, | 4.7 | 2.1 | 1.9 |
| 56 | 14 | ItA, | 1.0 | 1.2 | 3.2 |
| | | AA, | 3.4 | | |
| 57 | 21 | AA, | 9.7 | 4.0 | 3.5 |
| 58 | 22 | AA, | 9.8 | 5.3 | 2.5 |

TABLE II-continued

| Run No. | Starting Material, Table I Run No. | Acylating Agents[a] | Moles/Mole | Products, Units/Mole Ester | Primary Hydroxyl |
|---|---|---|---|---|---|
| 59 | 23 | AA, | 6.6 | 4.0 | 1.0 |
| 60 | 8 | MA, | 4.7 | 4.7 | .3 |
| 61 | 24 | AA, | >100%[c] | 50%[c] | 50%[c] |
| 62 | 8 | Stearic a. | 1.0 | 1.0 | 6.7 |
| 63 | 8 | Stearic a. | 4.8 | 4.8 | 2.9 |
| 64 | 8 | Stearic a. | 7.3 | 7.3 | .4 |
| 65 | 25 | Stearic a. | 9.2 | 9.2 | 36.8 |
| 66 | 25 | Stearic a. | 27.6 | 27.6 | 18.4 |
| 67 | 26 | Stearic a. | 4.1 | 4.1 | 3.1 |
| 68 | 27 | PA, | 2.5 | 2.5 | 2.3 |
| 69 | 28 | Stearic a. | 4.0 | 4.0 | 15.0 |
| 70 | 28 | Stearic a. | 1.5 | 1.5 | 17.5 |
| 71 | 29 | Stearic a. | 1.6 | 1.6 | 27.7 |
| 72 | 29 | Stearic a. | 4.0 | 4.0 | 25.3 |
| 73 | 29 | Stearic a. | 15.5 | 15.5 | 13.8 |
| 74 | 29 | Stearic a. | 23.0 | 23.0 | 6.3 |
| 75 | 29 | Lauric a. | 1.6 | 1.6 | 27.7 |
| 76 | 29 | Lauric a. | 7.7 | 7.7 | 21.6 |
| 77 | 29 | Lauric a. | 15.5 | 15.5 | 13.8 |
| 78 | 29 | Lauric a. | 23.0 | 23.0 | 6.3 |
| 79 | 10 | Stearic a. | 1.5 | 1.5 | 2.5 |
| 80 | 10 | Lauric a. | 1.5 | 1.5 | 2.5 |
| 81 | 10 | Oleic a. | 1.5 | 1.5 | 2.5 |
| 82 | 10 | Octanoic a. | 1.5 | 1.5 | 2.5 |
| 83 | 30 | Stearic a. | 1.5 | 1.5 | 1.6 |
| 84 | 31 | Stearic a. | 5.8 | 5.8 | 70.5 |
| 85 | 32 | FA-2[a], | 1.0 | 1.0 | 8.5 |
| 86 | 33 | FA-2[a], | 1.0 | 1.0 | 5.2 |
| 87 | 14 | Acetic a. AA | 1.5 3.4 | 4.9 | 0.2 |
| 88 | 16 | HDCA a. AA | .5 4.8 | 5.3 | 2.4 |

[a] AA is acrylic acid, MA is maleic anhydride, PA is phthalic anhyride, MAA is methacrylic acid, HDC is heptanedicarboxylic acid, ItA is itaconic anhydride and FA-2 is a mixture of tall oil fatty acids.
[b] The maleates are maleic half esters made by reaction of maleic anhydride. The phthalate was the diester made from the anhydride. HDC ester is heptanedicarboxylate.
[c] Since the molecular weight of the starting material (Run 24) was too high to be reliably determined, results are given in terms of percentages rather than moles; i.e., the starting material was reacted with a large excess, more than 100% by weight of AA, thus esterifying 50% of the hydroxyl present.

Boron Trifluoride Catalyst

In a manner similar to that for producing the products of Table II, a 50:50 (mole) TBGE/EO copolymer of about 1300 molecular weight, very similar to that of Run No. 11, was dealkylated and esterified. About 655 g (0.5 mole) copolymer, 250 g toluene, 144 g (1 mole) octanoic acid and 25 g BF$_3$ etherate (48% BF$_3$) were charged to a flask and the mixture slowly raised to about 125° C. The reaction was complete in about 2 hours as determined by separation of water and evolution of isobutylene. Titration indicated the octanoic acid was completely consumed. The products primary hydroxyls were therefor about 27% esterified.

We claim:

1. The process of making a glycidyl ester polymer comprising reacting a carboxylic acid or anhydride with a tert.-alkyl glycidyl ether polymer, comprising units represented by the formula

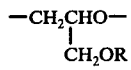

wherein R is tert.-alkyl, in the presence of a strong acid catalyst wherein the carboxylic acid or anhydride is selected from the group consisting of the polycarboxylic acids, the polycarboxylic acid anhydrides, the saturated fatty acids, the olefinic fatty acids, the aromatic monocarboxylic acids and the chloro- and bromo-analogs of saturated fatty acids, olefinic fatty acids and aromatic monocarboxylic acids.

2. The process of claim 1 wherein the catalyst is an arylsulfonic acid.

3. The process of claim 1 wherein the carboxylic acid is a fatty acid.

4. The process of claim 3 wherein the fatty acid is acrylic or methacrylic acid.

5. The process of claim 3 wherein the fatty acid has 12-18 carbon atoms.

6. The process of claim 1 wherein any alkene and water produced during the reaction is removed during the reaction.

7. The process of claim 1 wherein the reaction temperature is about 90°-150° C.

8. The process of claim 1 wherein an inert, water-immiscible organic solvent which refluxes at the desired reaction temperature is used as the reaction medium.

9. The process of claim 1 wherein the catalyst is an arylsulfonic, alkylsulfonic acid, phosphoric or sulfuric acid.

10. The process of claim 1 wherein the catalyst is a boron trifluoride.

11. The process of claim 1 wherein the carboxylic acid or anhydride is selected from acetic, butyric, lauric, stearic, acrylic, methacrylic, undecylenic, oleic, linoleic, benzoic, alkylbenzoic and naphthoic acids, chloro- and borom-analogs of the foregoing, succinic, adipic, sebacic, maleic, itaconic, citraconic, glutaconic, phtalic, isophtalic and terephthalic acids and their anhydrides.

12. The process of claim 1 wherein R is tert.-butyl or tert.-amyl.

* * * * *

UNITED STATES PATENT AND TRADEMARK OFFICE
CERTIFICATE OF CORRECTION

PATENT NO. : 4,092,339

DATED : May 30, 1978

INVENTOR(S) : Violete L. Stevens, Arthur R. Sexton and Frederick P. Corson

It is certified that error appears in the above-identified patent and that said Letters Patent are hereby corrected as shown below:

On the Title and Abstract Page, at "[*] Notice:" the following paragraph should read:

--The portion of the term of this patent subsequent to Jan. 18, 1994, has been disclaimed.--

Column 1, line 4: The following "Cross-References to Related Applications" paragraphs should be inserted:

--Cross References to Related Applications

This is a continuation-in-part of our copending application Serial No. 466,098, filed May 2, 1974, now abandoned.

Our copending applications Serial No. 444,078, now USP 4,014,854 and 466,099, now Serial No. 633,539, filed February 20, 1974 and May 2, 1974, and November 19, 1975, respectively, and USP 4,003,961 describe one aspect of the present invention wherein the present process is used to produce glycidyl ester copolymers wherein some but not all of the glycidyl groups are esterified.

UNITED STATES PATENT AND TRADEMARK OFFICE
CERTIFICATE OF CORRECTION

PATENT NO. : 4,092,339

DATED : May 30, 1978

INVENTOR(S) : Violete L. Stevens, Arthur R. Sexton and Frederick P. Corson

It is certified that error appears in the above-identified patent and that said Letters Patent are hereby corrected as shown below:

Col 1, line 4: 3rd Cross Reference paragraph:

The copending application of one of us (Arthur R. Sexton) with David L. Wolfe, Serial No. 415,458, filed November 12, 1973, now USP 4,048,237 discloses the cleavage of polymers of tert.-butyl and tert.-amyl glycidyl ethers by heating them under anhydrous conditions and in the presence of a sulfonic acid catalyst. Isobutylene or tert.-amylene and the corresponding glycidol polymer are the products.--

Column 1, lines 30-39:

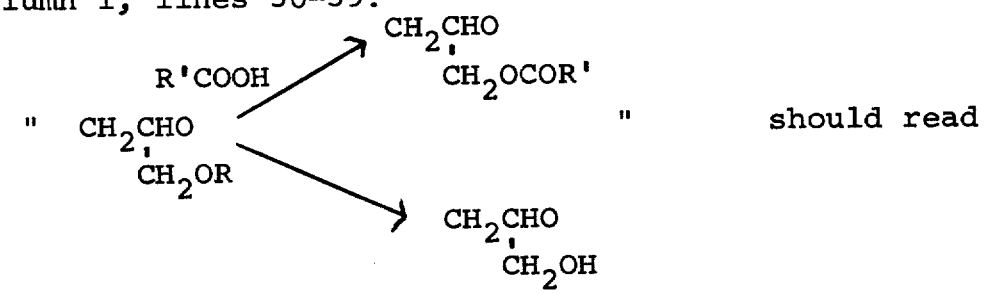

should read

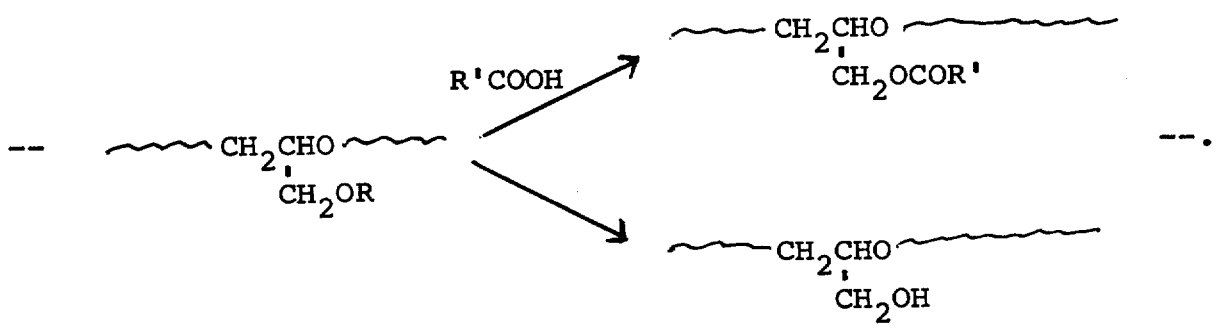

Column 2, line 4: "1,267,159" should read --1,267,259--.

Column 2, line 35: "acetic butyric," should read --acetic, butyric,--.

UNITED STATES PATENT AND TRADEMARK OFFICE
CERTIFICATE OF CORRECTION

PATENT NO. : 4,092,339

DATED : May 30, 1978

INVENTOR(S) : Violete L. Stevens, Arthur R. Sexton and Frederick P. Corson

It is certified that error appears in the above-identified patent and that said Letters Patent are hereby corrected as shown below:

Column 2, line 38: "an" should read --as--.

Column 2, line 56: " $\begin{array}{c} CH_2CHO \\ | \\ CH_2OR \end{array}$ " should read -- $\begin{array}{c} -CH_2CHO- \\ | \\ CH_2OR \end{array}$ --.

Column 4, line 16 of Table I under the column heading "Catalyst": "NA" should read --Na--.

Column 4, line 25 of Table I: Each of the last four numbers should be moved to the right one column.

Column 4, the second line under footnote c for Table I: "4 eg." should read --4 eq.--.

Column 6, line 15: "full" should read --fully--.

Column 6, line 29: "of the acetic" should read --of acetic--.

Column 7, line 1 of footnote a in Table II-continued: "PA is phthalic anhyride," should read --PA is phthalic anhydride--.

Column 8, line 60: "borom-analogs" should read --bromo-analogs--.

Signed and Sealed this

Twelfth Day of December 1978

[SEAL]

Attest:

RUTH C. MASON
Attesting Officer

DONALD W. BANNER
Commissioner of Patents and Trademarks